United States Patent [19]

Hardigg

[11] 4,118,265
[45] Oct. 3, 1978

[54] METHOD OF MAKING A BATTERY JAR

[76] Inventor: James S. Hardigg, Conway, Mass. 01341

[21] Appl. No.: 648,738

[22] Filed: Jan. 13, 1976

[51] Int. Cl.² .......................... B29C 5/00; B29F 1/00
[52] U.S. Cl. ................... 156/242; 156/245; 156/292; 156/304; 264/328; 429/163; 429/164; 429/176; 429/177; 429/247
[58] Field of Search ............ 156/242, 245, 304, 292; 264/248, 250, 255, 328; 29/2, 204; 429/163, 164, 176, 177, 247, 91, 175, 178; 220/4 B, 4 E

[56] References Cited

U.S. PATENT DOCUMENTS

| | | | |
|---|---|---|---|
| 2,219,576 | 10/1940 | Moreland | 156/292 |
| 2,289,872 | 7/1942 | Brinkmann | 220/4 E |
| 2,597,704 | 5/1952 | Carlson | 156/292 |
| 2,800,945 | 7/1957 | Schilling | 156/292 |
| 3,092,277 | 6/1963 | Brim | 220/4 E |
| 3,397,266 | 8/1968 | Ayers | 264/328 |
| 3,472,715 | 10/1969 | Weinbrenner et al. | 156/304 |
| 3,860,468 | 1/1975 | Scherer | 156/304 |
| 3,978,186 | 8/1976 | Lovejoy | 264/328 |
| 3,995,008 | 11/1976 | Spiegelberg | 264/328 |

Primary Examiner—Caleb Weston
Attorney, Agent, or Firm—Cushman, Darby & Cushman

[57] ABSTRACT

An elongated battery jar is made in sections by a process of injection molding with the sections being joined together by a heat-welding or friction-welding process. By forming the battery jar in sections variations in thickness of the walls of the battery jar are substantially reduced since molding drafts normally present in elongated battery jars formed by an injection molding process are substantially eliminated.

5 Claims, 10 Drawing Figures

U.S. Patent  Oct. 3, 1978  Sheet 2 of 3  4,118,265
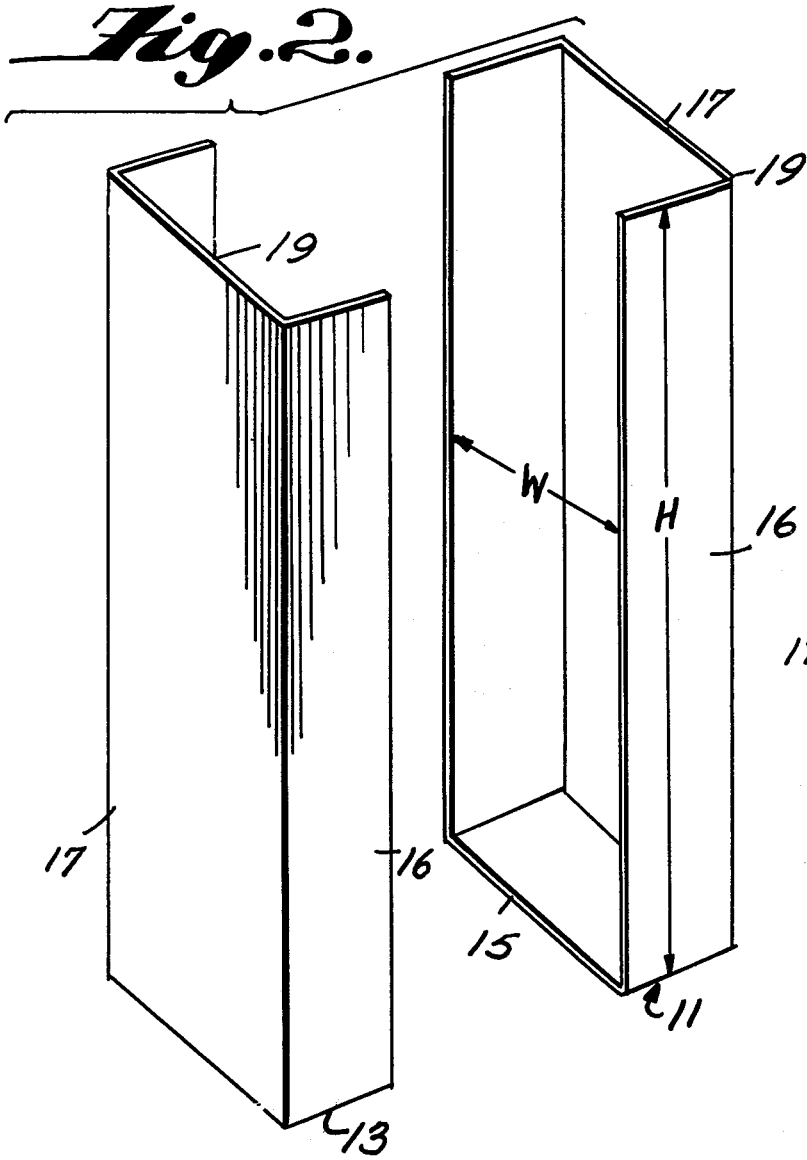
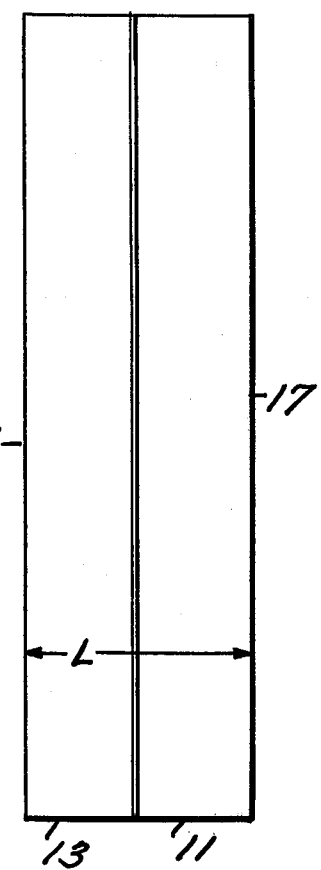
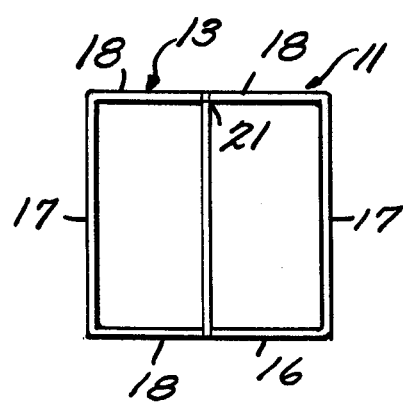

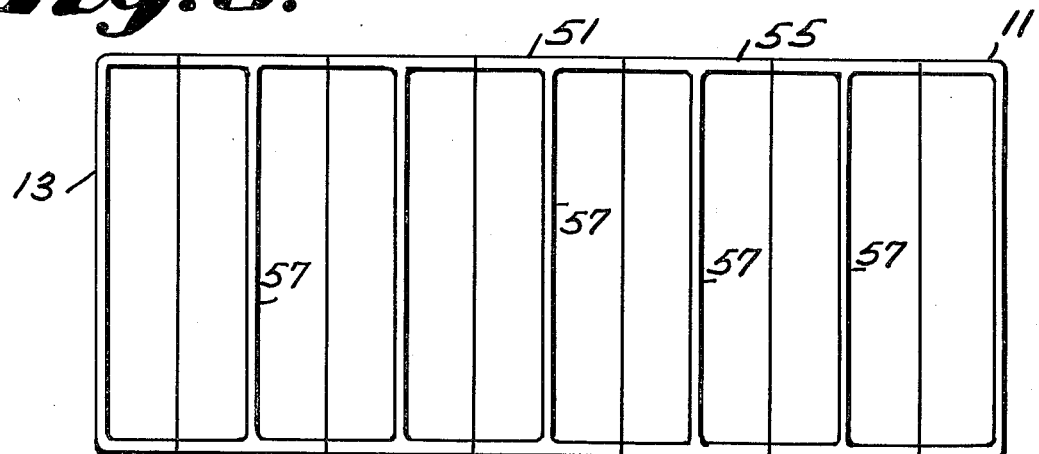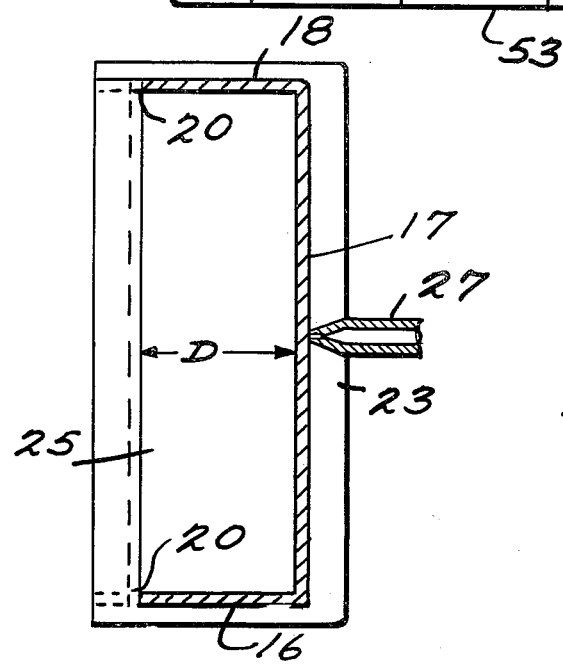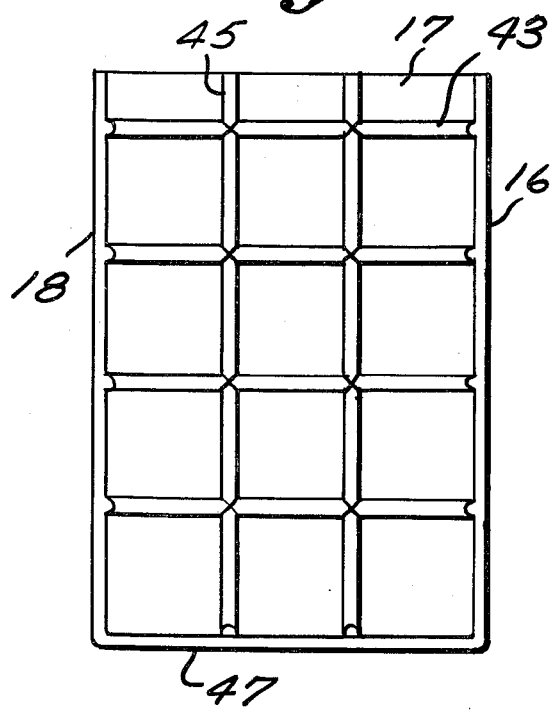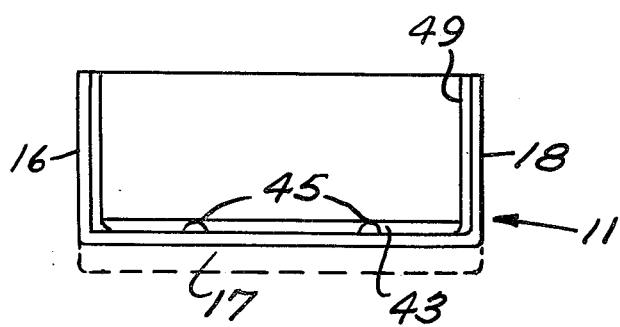

METHOD OF MAKING A BATTERY JAR

BACKGROUND OF THE INVENTION

This invention relates to an improved battery jar and method of making same. More specifically this invention relates to improved battery jars for mobile vehicles.

In the past, battery jars have been made of a number of different substances and by a number of different techniques. Thus battery jars have been formed of rubber, glass or insulated steel. More recently plastic materials have been utilized to produce reliable and lightweight battery jars. One conventional method of making plastic jars has been by the rotational molding process. Although the performance and the cost of these plastic jars have been more favorable than that of former constructions, the rotational molding process does not provide completely satisfactory dimensional control and has not been capable of handling materials such as polypropylene and low-melt index, high molecular weight polyethylene. Further, the rotational molding process requires substantial time and personnel and is quite sensitive to variations in the operation of the mold by an operator.

Plastic battery jars have also been formed in a single step by an injection molding process. One drawback, however, to forming certain types of battery jars, such as, elongated battery jars, in a single piece with an injection molding process is that the long flow path from the injection point at the bottom of the jar to the top thereof makes it necessary to have greater wall thickness thereby using more material per jar. In addition, the jar walls have a considerable "draft" from the bottom to the top in order to provide a successful mold. This despite the fact that it is desirable to have the opposing side walls of the jar parallel and of uniform thickness in order to make a tight pack of the battery plates inside of the jar from the bottom to the top thereof. Still another drawback is that with respect to jars used in moving vehicles, i.e., motive battery jars, there are approximately 40 different sizes required for the various batteries made. Since a different mold is required for almost every size variation, the cost of the molds for forming a complete line of such battery jars is enormous. In addition, the production costs are increased since molds must be changed very frequently in order to supply all sizes or in the alternative large numbers of bulky battery jars must be inventoried. Finally, in prior art injection molding processes, extra steps were required in order to form handles, edges for supporting the battery plates, etc., on the side walls of the battery jars.

It is accordingly an object of the present invention to provide an improved plastic battery jar.

It is another object of the present invention to provide an improved method of making plastic battery jars.

SHORT STATEMENT OF INVENTION

Accordingly, this invention relates to a battery jar and method of making same wherein the battery jar is formed in at least two sections. Each section of the battery jar is open at the top thereof and has an elongated open side. The distance from the open side of the section to its opposed closed side is at least several times smaller than the length of the elongated section from the top thereof to the bottom. The two end sections thus formed may be joined together by a heat or friction welding process to form a single chamber battery jar.

In an alternative arrangement, intermediate sections are formed having two open ends separated by an integrally formed elongated wall. The distance between the respective open ends of the intermediate sections and the intermediate wall is at least several times smaller than the distance from the top to the bottom of the elongated section. These sections can be joined to one another at their open ends to form intermediate chambers of a multi-chamber battery jar and in addition can be joined to the aforementioned end sections to form respective end chambers of the battery jar.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 2 is a perspective view of two end sections of the battery jar of the present invention;

FIG. 3 is a side elevation view of the battery jar having the end sections thereof joined together;

FIG. 4 is a plan view of the battery jar of FIG. 3;

FIG. 5 is a schematic illustration of the molding arrangement for forming the end sections of the battery jar of the present invention;

FIG. 6 is an alternate embodiment of the battery jar of the present invention showing an end view of a section of the battery jar, looking into the section from the open end thereof;

FIG. 7 is a plan view of the section of the battery jar illustrated in FIG. 6;

FIG. 8 is a plan view of a multi-section battery jar in assembled form;

DETAILED DESCRIPTION OF THE PREFERRED EMBODIMENT

Figure 1:
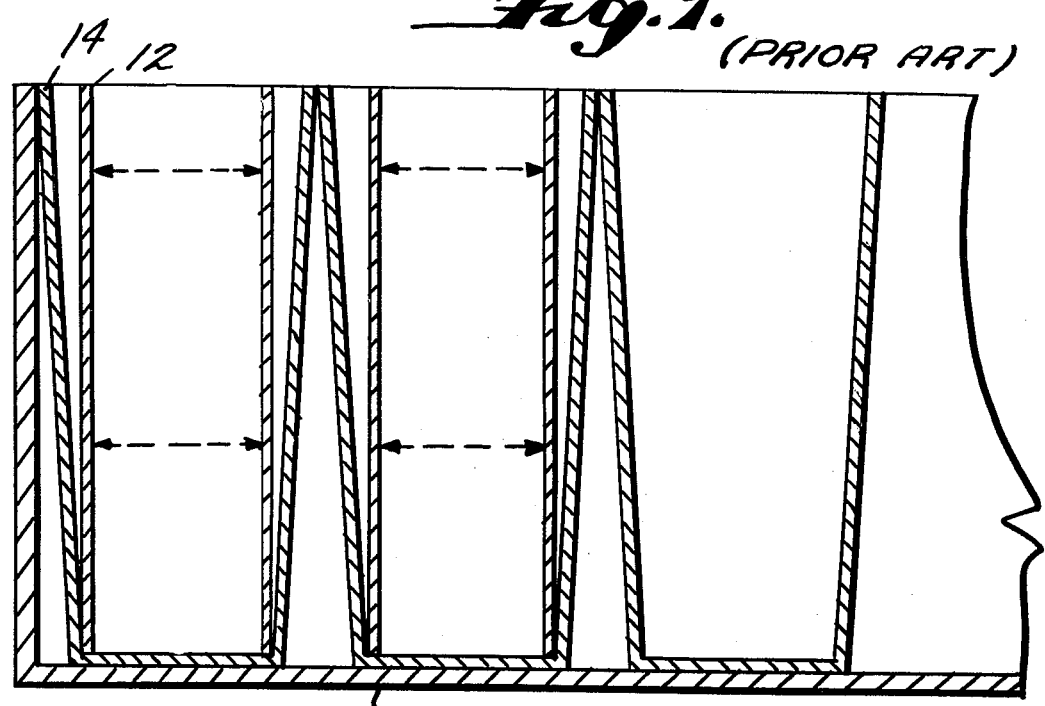
FIG. 1 is a section view taken in side elevation of conventional prior art plastic battery jars formed by an injection molding process and positioned within a battery jar container.

Refer now to FIG. 1 which is a cross-sectional view taken in side elevation of conventional prior art plastic battery jars formed by an injection molding process. Each of the battery jars are shown positioned within a metal casing 10. The battery jars are between 20 and 30 inches high, 6 to 9 inches wide, and 2 to 12 inches long. These battery jars are formed by a conventional injection molding technique, wherein the mold for forming the jars includes a platen and a movable mold member positioned inside thereof to define a cavity having the configuration of the jars of FIG. 1. The plastic material forming the battery jar is injected through the platen into the portion of the cavity which defines the bottom of the jar. Accordingly, it can be readily seen that the plastic material has to travel a maximum of about 23 to 35 inches before reaching the portion of the mold cavity which defines the top of the battery jars. Because of this, the walls of the battery jars, particularly towards the bottom of the battery, must of necessity be relatively thick. In addition since the movable mold member extends inwardly of the battery jar, the movable mold member must be tapered inwardly with the taper of the platen being complementary thereto in order to permit easy removal of the movable mold member away from the platen mold member after the plastic material has been injected into the cavity defined by the two mold members. This results in a draft which, as illustrated, results in battery jars being positioned within the steel container 10 such that a substantial amount of space is wasted. Further, and more importantly, because of the draft which results in the tapered walls of the battery jars, the battery plates positioned within the battery jar are not aligned parallel with the side walls of the battery jar. This is a critical defect in batteries which are subject to constant vibration, such as, batteries being utilized in movable vehicles. Thus, as illustrated in FIG. 1, battery plate 12 has the bottom thereof positioned contiguously against the bottom side wall of the battery jar 14. However, toward the top of the battery jar the side wall thereof slopes outwardly while the battery plate 12 remains substantially vertical. Thus, there is a space between the battery plate and the side wall of the battery jar which permits lateral movement of the battery plate. As is known in the art, if the battery plates within the battery jar do not form a tight pack, some of the compounds forming the battery plates which have little inherent strength will have a tendency to fall down away from the plates in the spaces created by the sloping side walls of the battery walls when the battery jar is vibrated. This has a tendency to reduce the lifetime of the battery and hence reduces its efficiency.

In the manufacture of batteries for motive vehicles, numerous sizes of battery jars are required. For example, the heights of the battery jars range between 20 and 30 inches. In the conventional prior are injection molding process for forming battery jars, variation in heights could be readily accommodated by using only one injection mold. Thus, after the battery jar was formed, the top of the battery jar could be sawed to the height desired. However, as is known in the art, the length dimension of the battery jar depends upon the number of battery plates to be positioned therein. This dimension can not be varied without altering the mold if conventional prior art injection molding techniques are utilized, with the result that the expense of manufacturing battery jars of various sizes is increased.

In order to overcome this problem in the art, applicant has provided a battery jar and method of making same wherein the thickness of the walls of the jar from top to bottom is substantially uniform over the length thereof, the taper along at least two sides of the jar is eliminated, and the taper along the other sides is reduced by a factor of at least 4. Thus referring to FIG. 2 the battery jar includes two end section members 11 and 13. End section member 11 has an elongated, open-sided box structure. The distance from surface 15 of member 11, i.e. the surface defining the open side of member 11 to side surface 17, is at least several times smaller than the distance from the top of the member defined by surface 19 to the bottom thereof. Typically the distance between the open side of the box and its opposed side wall 17 is 1/10 to ¼ the distance from the top to the bottom of the member 11. The size of the member 11, for example, may be 20 to 30 inches high, 6 to 9 inches across and 1 to 6 inches deep. An opposed end section member 13 is also provided having the same dimensions as end section member 11. These two sections may be joined together by a heat welding process to be explained more fully hereinbelow, or by a friction welding process or other suitable process known in the art to form an integral battery jar having side walls which are of substantially uniform thickness throughout the length thereof from top to bottom.

Refer now to FIG. 3 which is a side elevation view of the battery jar. The end section members 11 and 13 are shown joined together by an appropriate heat welding process. As illustrated, the jar is of substantially elongated form while at the same time, because of the heat welding of the members 11 and 13, is an integral jar requiring no external hoops or support members. As illustrated, the side walls 17 of the jar are parallel to one another and hence do not have any taper. A plan view of the battery jar is illustrated in FIG. 4 wherein the respective sections 11 and 13 are shown joined together by the heat welding process. The line 21 which extends about the perimeter of the jar defines an area in which the respective end section members 11 and 13 were joined together. As illustrated the side walls are formed parallel to one another. However, sides 16 and 18 of each jar are tapered inwardly towards wall 17 in order to provide easy removal of the battery jar sections from the mold. The taper is relatively small compared to the taper of the prior art injection molded jars of FIG. 1 since the distance along the tapered side is only about 1 to 6 inches in the present invention as opposed to 20–30 inches in the prior art injection molded cavities.

Refer now to FIG. 5 where there is disclosed a schematic illustration of the mold for forming the end section members 11 and 13. As illustrated, the mold includes a platen 23 which is fixedly positioned. A movable mold member 25 is provided which can be clamped into the position shown to define a cavity which has the shape of the end section members 11 and 13. The movable mold 25 includes conventional hydraulically driven ejector members 20 for removing the formed plastic section from the movable member. An injection nozzle 27 is illustrated through which molten plastic is coupled into the cavity defined by the platen 23 and the movable mold member 25. As is conventional in the art, the nozzle 27 may have a heating means therein for maintaining the plastic in its fluid state as the plastic is coupled into the cavity. In order to reduce the distance required for the plastic material to flow, additional injection nozzles can be utilized with each nozzle being spaced along the length of the portion of the platen 23 which forms the side wall 17. As aforementioned, this will permit the side walls of the battery jar to be of substantially uniform thickness.

After the cavity has been appropriately filled with the plastic material, the movable member 25 is unclamped and moved away from the platen 23. The formed end section member is then removed from the platen by means of the hydraulically driven ejector members 20 and the process is repeated. Because the movable member 25 has a relatively small depth dimension, little if any slope or tapering along the sides 16 and 18 of the movable mold member is necessary. This is in contradistinction to an arrangement where the distance D may be ten to twenty times greater than illustrated in FIG. 5. Thus, the end section member has a substantially uniform thickness along all its side walls with only walls 16 and 18 requiring any tapering.

After each side section is formed, the side section can be cut to the desired height by conventional techniques. In addition, the length $d$ of the sides 16 and 18 can be cut so that when two section members are joined together the overall length, $2d$, is the correct size to accommodate a desired number of plates. Thus, motive battery jars are typically made to accommodate anywhere from 5 to 33 battery plates and accordingly require a length dimension, 2d, ranging between 2 and 12 inches. It can, accordingly, be seen that by using a single mold not only can battery jars having a plurality of different heights be formed but also battery jars having a plurality of different width dimensions can be formed. Accordingly, by forming the battery jar in two sections and joining the sections together, there is a substantial reduction in the number of molds required to form battery jars of varying size.

It is additionally of critical importance that in the present invention the walls 17 of each section of the battery jar are formed without a taper. Thus, when the sections are joined together, the sides 17 are parallel to one another and, accordingly, can be made to fit into the receptacle 10 illustrated in FIG. 1 without wasting space and, more importantly, the parallel sides 17 permit a relatively tight positioning of the battery plates therein so that as the battery jar is vibrated the integrity of the battery plates is maintained.

Figure 9:
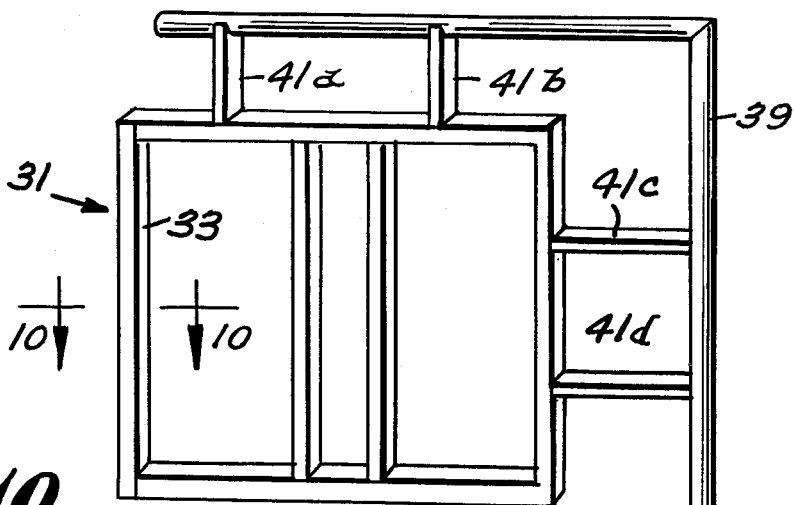
FIG. 9 is a perspective view of a rig for heating the edges of the battery jar sections prior to joining the sections together.
Figure 10:
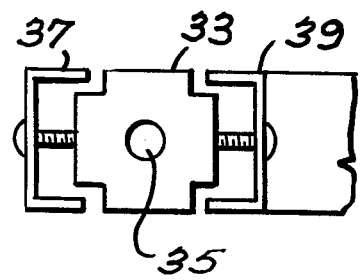
FIG. 10 is a section view taken along the line 10—10 of FIG. 9 showing the heating element and radiation insulator.

Refer now to FIG. 9 where there is disclosed a rig for heating the edges 15 of the end sections which are to be joined to one another. The rig includes a heat conducting framework 31 formed of an aluminum bronze alloy capable of conducting enough heat to soften the edges 15 of the sections of the battery jar so that the edges can be bonded together. Refer briefly to FIG. 10 where there is disclosed a section view of frame member 33 taken along lines 10—10 thereof. As illustrated, the member 33 has a heating element 35 of conventional design extending through the center thereof. U-shaped stainless steel insulators 37 and 39 are secured to the sides of the frame member 33 to prevent the loss of heat in a direction perpendicular to the direction in which the edges 15 of the battery jar section will align with the frame member 33. Thus, a substantial portion of the heat generated by heating element 35 is directed as illustrated by the arrows to thereby increase the efficiency of the heating element.

The frame 31 is spatially fixed by means of a support member 39 and a pair of titanium alloy support arms 41 for providing both vertical and lateral support. As illustrated, the heating rig of FIG. 9 is capable of simultaneously heating the edges 15 of four sections of a battery jar. While the heating rig of FIG. 9 is illustrated as the preferred device for effecting the bonding of the sections of the battery of the present invention, it should be understood that other bonding techniques as well as heating techniques may be utilized in keeping with the present invention.

Refer now to FIG. 6 where there is disclosed an alternate embodiment of the battery jar of the present invention. Illustrated in FIG. 6 is an end view of an end section member as viewed through the open side thereof. On wall 17 which opposes the open side of the end member, ribs 43 are formed which structurally reinforce the battery jar while at the same time providing a surface member upon which battery cells can be supported. In addition, a second set of ribs 45, which are longitudinally positioned, extend vertically along the wall 17 of the jar in spaced relationship to one another and are terminated in the bottom of the end section member 47 to provide members upon which the battery plates can rest if desired. These ribs provide additional support for the battery jar, thus enabling a further reduction in the quantity of plastic material required to support a predetermined load. The vertically oriented ribs 45 cannot be positioned along the sides 16 or 18 of the battery jar because of the problem of removing the movable member 25 away from the platen 23.

FIG. 7 illustrates a plan view of the embodiment of the end section member of FIG. 6. As illustrated, the walls 17, 16 and 18 are each of uniform thickness except for the ribs 43 and 45 which provide additional support for the battery jar. As illustrated in FIG. 7, no vertical ribs 45 are formed along the side walls 16 and 18. As aforementioned, it would not be possible to provide for the ribs 43 if the prior art injection molding techniques were utilized. Further, if desired a handle member 49 (illustrated in phantom) can be integrally formed in the battery section 11 by appropriately designing the platen 23 to have a lateral indented portion near the top thereof.

In an alternative embodiment of the invention, FIG. 8 illustrates a battery jar having end section members 11 and 13, and having a plurality of intermediate section members 55. The intermediate section members 55 are open-sided with a wall 57 of uniform thickness separating the respective open sides of the sections 55. The side walls 51 and 53 are of substantially uniform thickness as is the bottom thereof. The intermediate sections are preferably formed by an injection molding process wherein a platen has two movable members, one on each side thereof. When the molten plastic has been injected to a cavity having the shape of the intermediate sections 55, the movable molding members are moved away from the platen to thereby remove the formed section from the mold. After being formed the intermediate sections are joined to one another and to the end sections 11 and 13 by means of a heat or friction welding process.

In the preferred embodiment the plastic battery jars may be formed of polyethylene, polypropylene, ABS, or other suitable plastic materials. Because of the manner in which the battery jars are formed no drafts are required, and accordingly, the walls are of uniform thickness and are substantially untapered. This results in a substantial savings of space and material required by the battery jar to thereby provide a more economic battery jar.

While the present invention has been disclosed in connection with a preferred embodiment thereof, it should be understood that there may be other alternative embodiments which fall within the spirit and scope of the invention as defined by the appended claims.

What is claimed is:

1. A method of making an elongated battery jar comprising the steps of forming a first open-sided end section member, said end section member being open at the top thereof and having an elongated open side, the distance from said open side to its opposed closed side being at least several times smaller than the distance from top to bottom thereof, said forming step including the step of injecting a plastic material into a mold, said mold defining a plastic material receiving cavity having the shape of said first open-sided end section member and having at least one injection orifice for the ingress of plastic material to said cavity, said at least one injection orifice being positioned along the portion of said cavity defining the opposed closed side of said member, and being substantially symmetrical in a horizontal plane therethrough, forming a second open-sided end section member, heating the surface of said end section members which define the open side thereof, and joining said end section members at their respective heated surfaces to form a battery jar, said jar having a substantially uniform wall thickness from top to bottom thereof.

2. A method of making an elongated battery jar comprising the steps of:

forming a first open sided end section member, said end section member being open at the top thereof and having an elongated open side, the distance from said open side to its opposed closed side being at least several times smaller than the distance from top to bottom thereof, said forming step including the step of injecting a plastic material into a mold, said mold defining a plastic material receiving cavity having the shape of said first open sided end section member and having at least one injection orifice for the ingress of plastic material to said cavity, said at least one injection orifice being positioned along the portion of said cavity defining the opposed closed side of said box, forming a second open sided end section member having the same shape as said first end section member, forming an intermediate section member having two elongated open sides facing away from an intermediate wall, the distance from the surfaces defining said open sides to said intermediate wall being at least several times smaller than the length of the elongated intermediate section from top to bottom, heating the surfaces of said end section members which define the open side thereof, heating the surfaces defining said open sides of said intermediate section member, and joining said heated surfaces of one end section member to one of the heated surfaces of said intermediate section member, and joining the heated surfaces of the other of said end section members to the other heated surface of said intermediate member, said battery jar thereby having a plurality of walls of substantially uniform wall thickness.

3. A method of making an elongated battery jar having a first end member which is open at the top thereof and which has an elongated open side and three elongated closed sides, the distance from the surface defining the open side to its opposed closed side being at least several times smaller than the distance from the top to the bottom thereof, the end member having a wall thickness which is substantially the same from the top to the bottom thereof, a second open sided elongated end member being a mirror image of said first end member with said first and second end members being joined together to form a battery jar at the respective elongated open ends, the method comprising the steps of forming a first open sided end member, said end member being open at the top thereof and having an elongated open side, the distance from said open side to its opposed closed side being at least several times smaller than the distance from the top to bottom thereof and said end member having a wall thickness which is substantially the same from the top to the bottom thereof, said forming step including the step of injecting a plastic material into a mold, said mold defining a plastic material receiving cavity having the shape of said first open sided end member and having at least one injection orifice for the ingress of plastic material to said cavity, said at least one injection orifice being positioned intermediate the top and bottom of said end member along the portion of said cavity defining the opposed closed side of said end member and being positioned substantially equidistant from said open side, forming a second open sided end member having the same shape as said first end member, heating the surfaces of said end members which define the open side thereof, and joining said end members at the respective heated surfaces to form a battery jar, said battery jar having a substantially uniform wall thickness.

4. The method of claim 3 further comprising the step of forming ribs integral with said first and second end members, said ribs being aligned substantially parallel with the planes defining the top and bottom of said end members.

5. The method of claim 4 further comprising the step of forming a second set of ribs integral with said end members, said second set of ribs being aligned perpendicular to said first set of ribs.

* * * * *